United States Patent
Azima et al.

(10) Patent No.: US 6,169,809 B1
(45) Date of Patent: Jan. 2, 2001

(54) VISUAL DISPLAY MEANS INCORPORATING LOUDSPEAKERS

(75) Inventors: Henry Azima, Cambridge; Martin Colloms, London; Neil Harris, Great Shelford, all of (GB)

(73) Assignee: New Transducers Limited, London (GB)

( * ) Notice: Under 35 U.S.C. 154(b), the term of this patent shall be extended for 0 days.

(21) Appl. No.: 09/011,834

(22) Filed: May 13, 1998

Related U.S. Application Data

(63) Continuation-in-part of application No. 08/707,012, filed on Sep. 3, 1996.

(51) Int. Cl.[7] .................................................. H04R 25/00
(52) U.S. Cl. ........................................... 381/152; 381/190
(58) Field of Search ................................. 381/152, 190, 381/386, 182

(56) References Cited

U.S. PATENT DOCUMENTS

| | | | |
|---|---|---|---|
| 1,817,630 | * | 8/1931 | Kroesen ............................. 381/152 |
| 3,247,925 | * | 4/1966 | Warnaka . | |
| 3,553,392 | * | 1/1971 | Liebscher et al. ................... 381/152 |
| 4,198,550 | * | 4/1980 | Matsuda et al. . | |
| 4,439,640 | * | 3/1984 | Takaya ................................. 381/190 |
| 4,449,019 | * | 5/1984 | Kakehi et al. ...................... 381/190 |
| 4,899,390 | * | 2/1990 | Takewa et al. ..................... 381/182 |
| 5,025,474 | | 6/1991 | Tanaka et al. ........................ 381/90 |
| 5,031,222 | * | 7/1991 | Takaya ................................ 381/190 |
| 5,347,630 | * | 9/1994 | Ishizawa et al. . | |
| 5,400,414 | * | 3/1995 | Thiele . | |
| 5,796,854 | * | 8/1998 | Markow .............................. 381/386 |

FOREIGN PATENT DOCUMENTS

| | | | |
|---|---|---|---|
| 4-140999 | * | 5/1992 | (JP) ............................. 381/FOR 146 |
| WO 95/31805 | | 11/1995 | (WO) . |

* cited by examiner

*Primary Examiner*—Curtis A. Kuntz
(74) *Attorney, Agent, or Firm*—Foley & Lardner

(57) ABSTRACT

A visual display unit having a display screen, a housing in which the display screen is mounted, and a loudspeaker in the housing comprising a member capable of sustaining and propagating input vibrational energy by a plurality of resonant bending wave modes in an operative area, the frequencies of the resonant bending wave modes being interleaved so that resonant bending wave modes are evenly distributed. A transducer is mounted wholly and exclusively on the operative area of the member at a preferential location which substantially maximizes acoustic coupling to the resonant bending wave modes in the member, the resonant bending wave modes in turn producing an acoustic output.

10 Claims, 3 Drawing Sheets

VISUAL DISPLAY MEANS INCORPORATING LOUDSPEAKERS

This application is a continuation-in-part of application Ser. No. 08/707,012, filed Sep. 3, 1996.

DESCRIPTION

1. Technical Field

The invention relates to visual display apparatus and more particularly to visual display means (hereinafter visual display units) incorporating loudspeakers.

2. Background Art

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientation s, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a working frequency band for the loudspeaker.

DISCLOSURE OF INVENTION

Embodiments of the present invention use members of nature, structure and configuration achievable generally and/or specifically by implementing teachings of our co-pending patent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in co-pending patent application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with active acoustic devices e.g. in the form of loudspeakers for visual display means. Members as above are herein called distributed mode radiators and are intended to be characterised as in the above co-pending patent application and/or otherwise as specifically provided herein.

The invention is a visual display unit comprising a display screen, a housing in which the display screen is mounted and a loudspeaker in the housing, characterised in that the loudspeaker comprises a a stiff lightweight member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted wholly and exclusively on said member at one of said locations or sites to vibrate the member to cause it to resonate forming an acoustic radiator which provides an acoustic output when resonating. The radiator may be integral with the housing. The housing may have an external wall with which the radiator is integral. The radiator may comprise a cellular core sandwiched by skin layers, one of which skin layers is integral with the housing. The said one skin layer may be thinner than the average wall thickness of the housing. The external wall of the housing may be formed with a groove which surrounds the radiator and which defines a resilient suspension coupling the loudspeaker to the housing. At least one slot may be provided in the groove to increase the compliance of the suspension.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
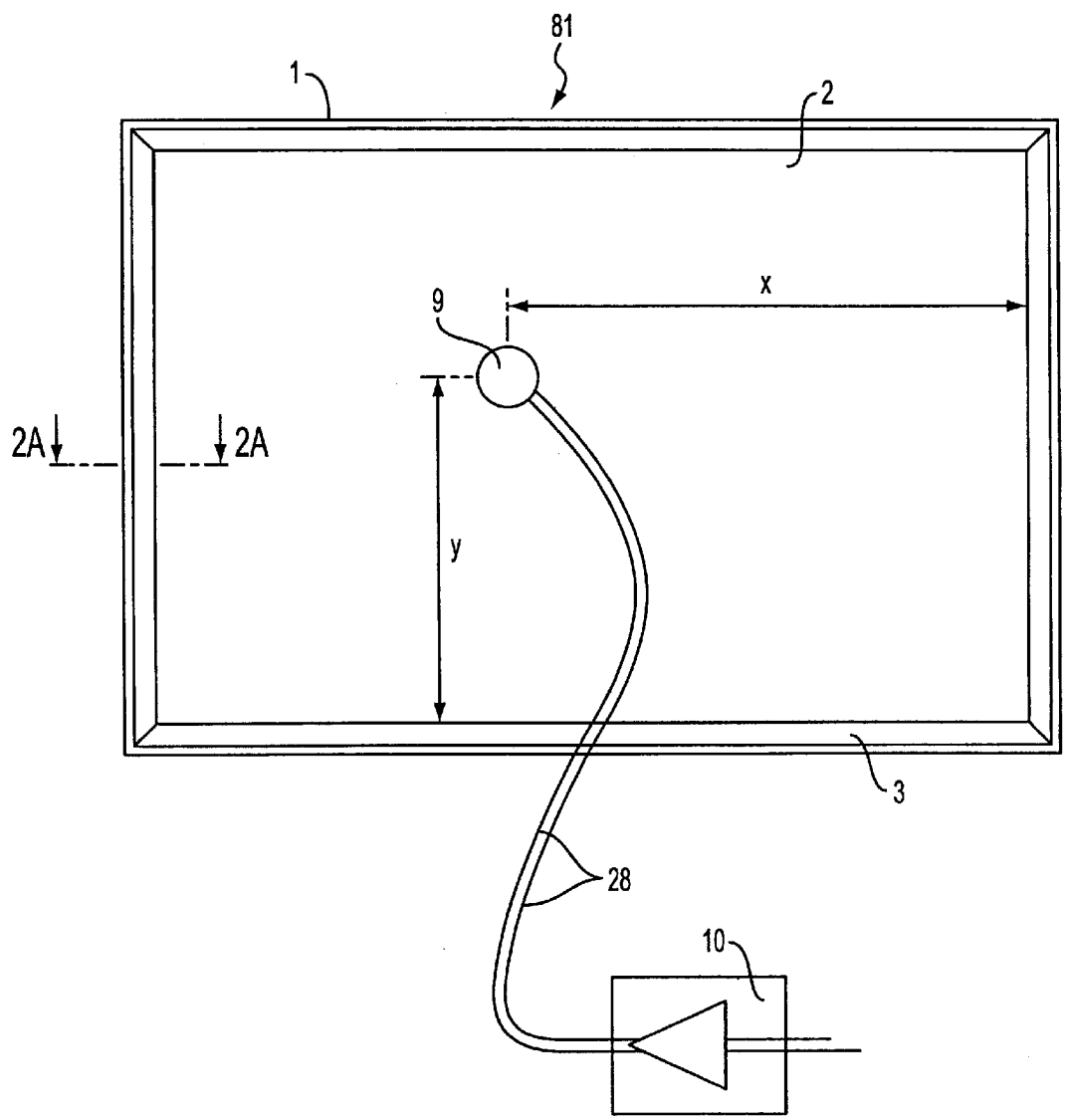
FIG. 1 is a diagram showing a distributed-mode loudspeaker as described and claimed in our co-pending patent application Ser. No. 08/707,012.

Referring to FIG. 1 of the drawings, there is shown a panel-form loudspeaker (81) of the kind described and claimed in our co-pending patent application Ser. No. 08/707,012 comprising a rectangular frame (1) carrying a resilient suspension (3) round its inner periphery which supports a distributed mode sound radiating panel (2). A transducer (9) e.g as described in detail with reference to our co-pending patent application Ser. No. 09/011,773, 09/011, 70 and 09/011,831, is mounted wholly and exclusively on or in the panel (2) at a predetermined location defined by dimensions x and y, the position of which location is calculated as described in our co-pending patent application Ser. No. 05/707,012, to launch bending waves into the panel to cause the panel to resonate to radiate an acoustic output.

The transducer (9) is driven by a signal amplifier (10), e.g. an audio amplifier, connected to the transducer by conductors (28). Amplifier loading and power requirements can be entirely normal, similar to conventional cone type speakers, sensitivity being of the order of 86–88dB/watt under room loaded conditions. Amplifier load impedance is largely resistive at 6 ohms, power handling 20–80 watts. Where the panel core and/or skins are of metal, they may be made to act as a heat sink for the transducer to remove heat from the motor coil of the transducer and thus improve power handling.

Figure 2A:
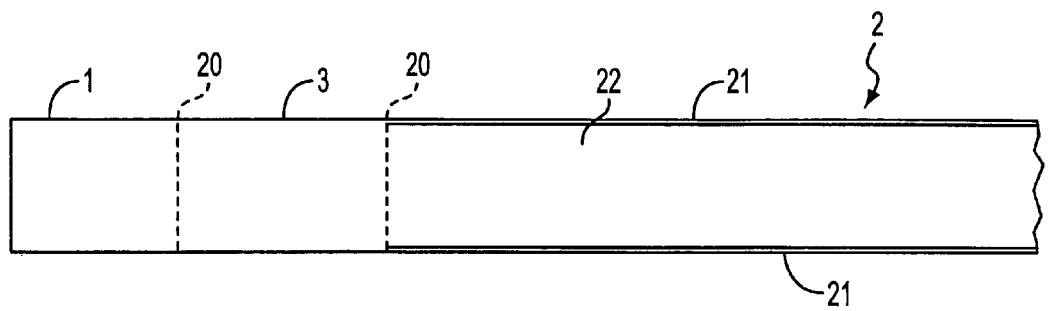
FIG. 2a is a partial section on the line A—A of FIG. 1.
Figure 2B:
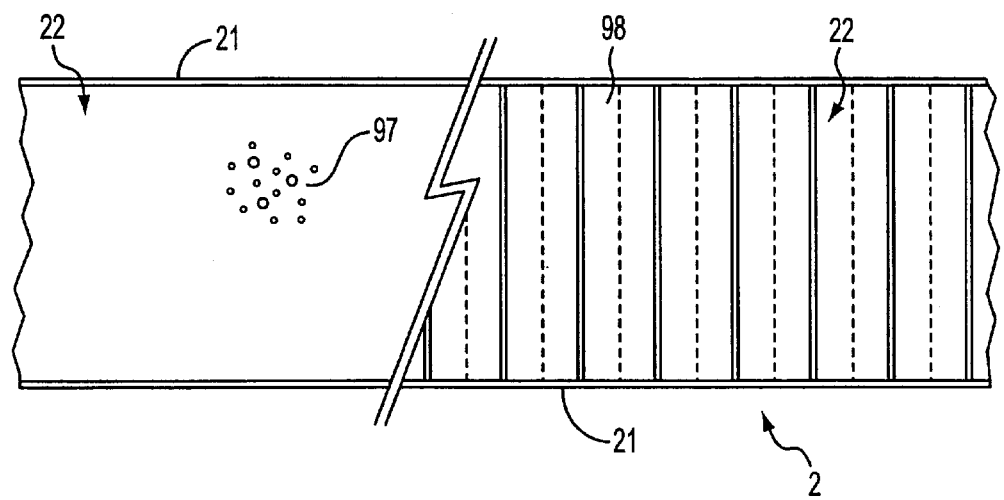
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar (RTM) or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30cm diameter. This material self forms an orientated crystal structure in the direction of injection, a preferred orientation for the good propagation of treble energy from the driving point to the panel perimeter.

Additional such moulding for this and other thermoplastics allows for the mould tooling to carry location and registration features such as grooves or rings for the accurate location of transducer parts e.g. the motor coil, and the magnet suspension. Additionally with some weaker core materials it is calculated that it would be advantageous to increase the skin thickness locally e.g. in an area or annulus up to 150% of the transducer diameter, to reinforce that area and beneficially couple vibration energy into the panel. High frequency response will be improved with the softer foam materials by this means.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

Several of the preferred formulations for the panel employ metal and metal alloy skins, or alternatively a carbon fibre reinforcement. Both of these, and also designs with an alloy Aerogel or metal honeycomb core, will have substantial radio frequency screening properties which should be important in several EMC applications. Conventional panel or cone type speakers have no inherent EMC screening capability.

In addition the preferred form of piezo and electro dynamic transducers have negligible electromagnetic radiation or stray magnetic fields. Conventional speakers have a large magnetic field, up to 1 metre distant unless specific compensation counter measures are taken.

Where it is important to maintain the screening in an application, electrical connection can be made to the conductive parts of an appropriate distributed mode acoustic radiator panel or an electrically conductive foam or similar interface may be used for the edge mounting.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall-off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
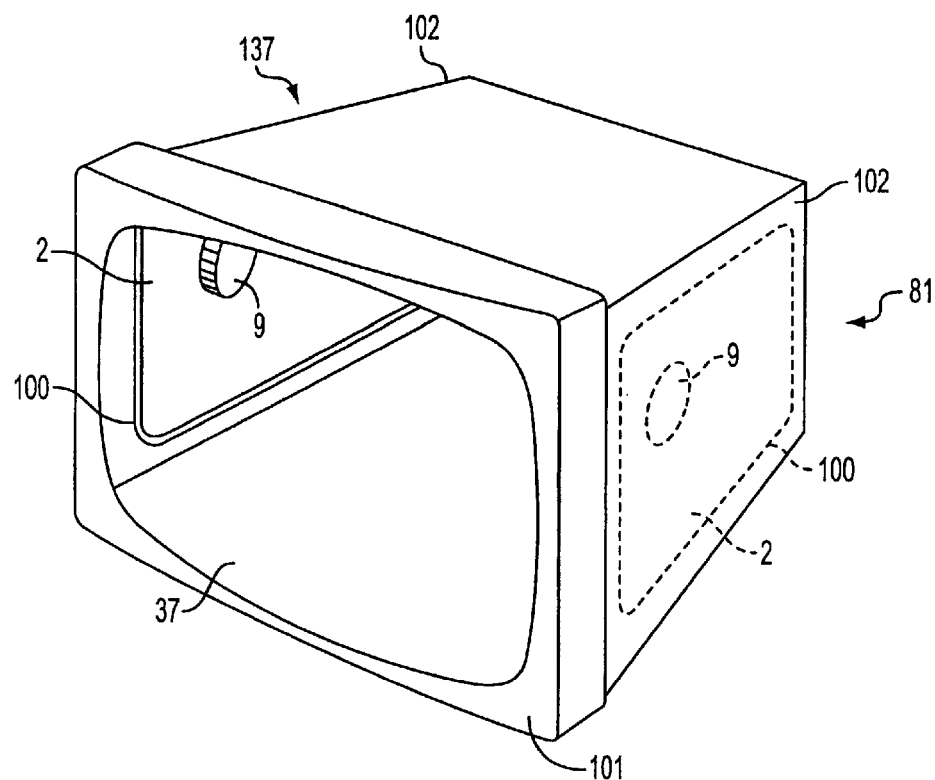
FIG. 3 is a perspective diagram of an embodiment of visual display unit incorporating a loudspeaker according to the present invention.
Figure 4:
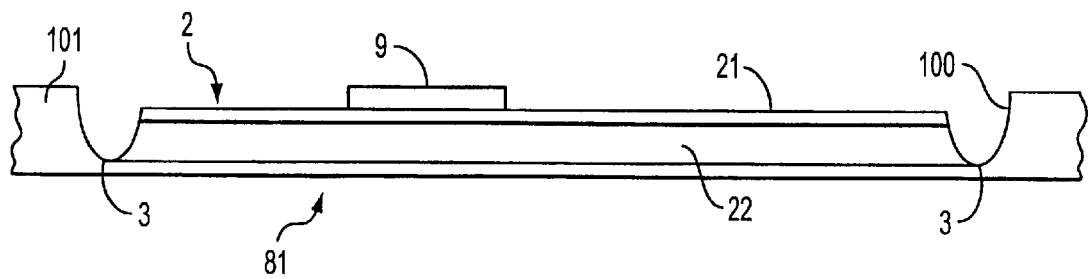
FIG. 4 is a partial cross-sectional view, through the loudspeaker shown in FIG. 3.

FIG. 3 illustrates a visual display unit (137) e.g. a computer monitor or the like having a screen (37) formed in any desired fashion e.g. as a cathode ray tube or as a liquid crystal display. The unit (137) comprises a box-like housing (101) having opposed sides (102) each of which is formed to incorporate a multi-mode acoustic radiator (2) generally similar to that described above with reference to FIGS. 1 and 2 to form loudspeaker (81).

The housing (101) is moulded from plastics and the opposed sides (102) are moulded with generally rectangular relatively thin rectangular areas, in comparison to the general thickness of the housing, bounded by grooves (100) to define the radiators (2). These areas (2) are stiffened on their inner faces with a lightweight core (22) which is backed by an inner skin (21) to form a rigid lightweight multi-mode radiator panel (2) of the kind described above e.g. with reference to FIGS. 1 and 2. The grooves effectively define a resilient suspension (3) of the kind shown in FIGS. 1 and 2 and the surrounding housing (101) forms the frame (1). Slots (not shown) may be provided in the grooves and which pierce through the housing to increase the compliance of the suspension.

A transducer (9) e.g. of the kind described in detail in our co-pending patent application Ser. Nos. 09/011,773, 09/011,770 and 09/011,831 is attached to each panel (2) to launch bending waves into the panels to cause them to resonate to produce an acoustic output.

What is claimed is:

1. A visual display unit comprising a display screen, a housing in which the display screen is mounted, and a loudspeaker in the housing, wherein the loudspeaker comprises:
    a member having capability to sustain and propagate input vibrational energy by a plurality of resonant bending wave modes in at least one operative area extending transversely of thickness, wherein the frequencies of resonant bending wave modes are interleaved in the predetermined frequency range so that the frequencies of the resonant bending wave modes are substantially evenly distributed; and
    a transducer mounted wholly and exclusively on said operative area of the member, at a preferential location or site for coupling to the resonant bending wave modes, to vibrate the member and excite said resonant bending wave modes in the member, the resonant bending wave modes in turn producing an acoustic output, and wherein the housing has an external wall which is integral with the member and is formed with a groove which surrounds the member and defines a resilient suspension coupling the loudspeaker to the housing.

2. A visual display unit according to claim 1, wherein the member (2) comprises a cellular core (22) sandwiched by skin layers (21), one of which skin layers is integral with the housing.

3. A visual display unit according to claim 2, wherein the said one skin layer (21) is thinner than the average wall thickness of the housing (101).

4. A visual display unit according to claim 3, wherein there is at least one slot in the groove (100) to increase the compliance of the suspension.

5. A visual display unit according to claim 1, wherein there is at least one slot in the groove to increase compliance of the suspension.

6. A visual display unit comprising a display screen, a housing in which the display screen is mounted and a loudspeaker in the housing, wherein the loudspeaker comprises:
    a stiff lightweight member having capability to sustain and propagate input vibrational energy by bending waves in at least one operative area extending transversely of thickness to have resonant mode vibration components distributed over said at least one area and have predetermined preferential locations or sites within said area for a transducer, and
    a transducer mounted wholly and exclusively on said member at one of said locations or sites to vibrate the member to cause it to resonate forming an acoustic radiator which provides an acoustic output when resonating,
and wherein the housing has an external wall which is integral with the member and is formed with a groove which surrounds the member and defines a resilient suspension coupling the loudspeaker to the housing.

7. A visual display unit according to claim 6, wherein the member comprises a cellular core sandwiched by skin layers, one of which skin layers is integral with the housing.

8. A visual display unit according to claim 7, wherein the said one skin layer is thinner than the average wall thickness of the housing.

9. A visual display unit according to claim 8, wherein there is at least one slot in the groove to increase compliance of the suspension.

10. A visual display unit according to claim 6, wherein there is at least one slot in the groove to increase compliance of the suspension.

* * * * *

UNITED STATES PATENT AND TRADEMARK OFFICE
CERTIFICATE OF CORRECTION

PATENT NO.   : 6,169,809 B1
DATED         : January 2, 2001
INVENTOR(S)  : Henry Azima et al.

It is certified that error appears in the above-identified patent and that said Letters Patent is hereby corrected as shown below:

In the filing date section, please delete "(22) Filed: May 13, 1998" and insert the following:
-- [22]  PCT Filed:     Sep. 2, 1996
   [86]  PCT No.:  PCT/GB96/02151
§ 371 Date:  May 13, 1998
§ 102 (e) Date:  May 13, 1998 --.

Signed and Sealed this

Ninth Day of October, 2001

*Attest:*

NICHOLAS P. GODICI
*Attesting Officer*     Acting Director of the United States Patent and Trademark Office